(12) United States Patent
Chen

(10) Patent No.: US 7,251,201 B2
(45) Date of Patent: Jul. 31, 2007

(54) METHOD OF SEARCHING NEW WRITABLE ADDRESS FOR OPTICAL RECORDABLE MEDIUM

(75) Inventor: Ping-Sheng Chen, Chia I Hsien (TW)

(73) Assignee: Media Tek Inc., Hsin-Chu (TW)

( * ) Notice: Subject to any disclaimer, the term of this patent is extended or adjusted under 35 U.S.C. 154(b) by 769 days.

(21) Appl. No.: 10/640,383

(22) Filed: Aug. 14, 2003

(65) Prior Publication Data

US 2005/0036406 A1    Feb. 17, 2005

(51) Int. Cl.
  *G11B 7/085* (2006.01)
(52) U.S. Cl. .................. 369/30.12; 369/53.24
(58) Field of Classification Search ............ 369/30.1, 369/30.11, 30.12, 30.13, 30.14, 30.17, 30.18, 369/53.24, 44.27, 44.28, 47.14, 53.17, 53.35
See application file for complete search history.

(56) References Cited

U.S. PATENT DOCUMENTS

| 4,432,082 A | * | 2/1984 | Hsieh et al. | 369/30.17 |
| 5,812,502 A | * | 9/1998 | Hirai et al. | 369/47.34 |
| 5,896,351 A | * | 4/1999 | Misaizu et al. | 369/30.11 |
| 5,920,526 A | * | 7/1999 | Udagawa | 369/30.15 |
| 6,920,092 B2 | * | 7/2005 | Kuriuzawa et al. | 369/44.28 |
| 6,967,912 B1 | * | 11/2005 | Roh | 369/47.38 |
| 2002/0101793 A1 | * | 8/2002 | Sakata | 369/30.13 |

\* cited by examiner

*Primary Examiner*—Wayne Young
*Assistant Examiner*—Abdukader Muhammed
(74) *Attorney, Agent, or Firm*—Browdy and Neimark, PLLC

(57) ABSTRACT

A method of searching a new writable address (NWA) for an optical recordable medium includes providing an optical pickup head and setting a first search starting point thereof; determining if NWA is located at the latest track and setting a search finishing point of the optical pickup head; setting a second search starting point as the distance between the search finishing point and the first search starting point is less than a first predetermined block time duration; decoding the stored digital information and lasting the step of decoding for a third predetermined block time from the first search starting point; and detecting whether a run-out block has been decoded during an N block time duration, wherein said N block time duration is less than said third predetermined block time duration, and determining said new writable address.

11 Claims, 4 Drawing Sheets

METHOD OF SEARCHING NEW WRITABLE ADDRESS FOR OPTICAL RECORDABLE MEDIUM

BACKGROUND OF THE INVENTION

1. Field of the Invention

The present invention is directed to a method of searching new writable address (which is referred to hereinafter as "NWA) for optical recordable medium, and more particularly, to a method of searching NWA having no repeatedly operated short seeking and following.

2. Description of the Prior Art

For every optical medium, regardless of CD-R or CD-RW, it is unavoidable to have to locate where the NWA for the next data recording operation is following the former data recording operation. Thereby, the optical pickup head will be able to move to the location of NWA in advance before the new data recording operation begins.

A widely-used optical recordable medium at least includes a plurality of sessions, which each includes a program area that further includes at least one program sub-area (track) therein. Tracks serve to record digital information. Taking the operation of writing packets to the tracks, for example, if the digital information recorded over the period of one data recording operation is not recorded to one complete track at once, the lead-in area of this optical medium will record the location of this track but has no knowledge of the information regarding where the NWA of this track is. Tracks of the optical medium are distributed in a spiral and successive manner, and, consequently, when it comes to beginning another recording operation, the searching for the location of NWA becomes very critical. Prior art methods at first move the optical pickup head to the area around the NWA (which is referred to hereinafter as "rough tuning."), and after the step of rough tuning, move the optical pickup head with the method of so-called "fine-tuning," so as to locate the accurate NWA. In other words, the optical pickup head will be moved to somewhere around the end of the recorded digital information in the former recording operation with the method of rough tuning, such as the method of locating a point midway between two reference points, at the very beginning in terms of "long seek." However, the rough tuning should be executed only once due to the demand of less and less response time the optical pickup head is supposed to take as the latest information recording is going to be proceeded. The long seek at times is not necessary if the pickup head is not far away from the area where the digital information is recorded in last recording operation. Thereafter, operations of fine-tuning in terms of "short seeking" and "following" are going to be performed repeatedly, so as to locate the NWA.

Please refer to FIGS. 1A to 1C of illustrating a flow chart based on the prior art NWA searching method 50. The prior art method 50 includes steps of:

Step 51: starting steps of rough tuning;

Step 52: setting a first search starting point substantially equal to deducting the time duration preferably covering 75 blocks from the start time of the given track (the first predetermined rule);

Step 53: determining if this track is the end track of the program area, if not, go to Step 54, otherwise, go to Step 55 (the second predetermined rule);

Step 54: setting a search finishing point to be substantially equal to the end time of the track;

Step 55: setting the search finishing point to be the start time of the lead-out area of this session;

Step 56: determining if the difference between the search finishing point and the first search starting point is less than a first predetermined block time duration preferably equal to the time duration covering 100 blocks, if yes, go to Step 57, otherwise, go to Step 58 (the third predetermined rule);

Step 57: setting a second search starting point to be substantially equal to the first search starting point, and go to Step 59;

Step 58: setting the second search starting point to be substantially equal to the average of the first search starting point and search finishing point, and go to Step 61;

Step 59: finishing the rough tuning;

Step 61: determining if the pickup head is located at the blank area of the optical medium or not, if yes, go to Step 63, otherwise, go to Step 62;

Step 62: setting the first search starting point to be substantially equal to the second search starting point, and go back to Step 56; and Step 63: setting the search finishing point to be substantially equal to the second search starting point, and go back to Step 56 as well.

FIG. 1A shows the flow of rough tuning as the NWA searching begins, which is followed by steps of fine-tuning, as illustrated in FIGS. 1B and 1C. The steps of fine-tuning include:

Step 74: starting steps of fine-tuning;

Step 76: determining if the pickup head is located on the blank area of this optical medium or not, if true, go to Step 77, or go to Step 78 instead;

Step 77: determining if the second search starting point is larger than the first search starting point, and then go to Step 79 if the consequence of above determination is true, otherwise, go to Step 80;

Step 78: assigning the present location of optical pickup head to the second search starting point and go to Step 81;

Step 79: finishing the fine-tuning;

Step 80: moving the pickup head to the location is substantially equal to having a fourth predetermined block time duration, preferably equal to the time duration covering 10 blocks, deducted from the second search starting point;

Step 81: determining if the second search starting point is less than the search finishing point, if yes, go to Step 76, and, otherwise go to Step 82;

Step 82: determining if the pickup head is on the end track at the present time, if yes, go to Step 84, otherwise, go to Step 83;

Step 83: setting the end time of the track as the NWA, and go to Step 89 thereafter;

Step 84: setting the start time of the lead-out area of the session as the NWA; and Step 89: end.

Steps shown in FIG. 1C follows steps of FIG. 1B include:

Step 91: searching the run-out blocks;

Step 93: setting the latest second search starting point with deducting 3 block time duration from the former second search starting point;

Step 95: starting to read the digital information from the latest second search starting point;

Step 97: moving the pickup head back and forth so as to locate the run-out blocks;

Step 98: setting the latest second search starting point as NWA; and

Step 99: finishing steps of fine-tuning.

As searching the NWA, this prior art method in advance has to figure out the range of searching, which theoretically should have the NWA therein, with setting the first search starting point and search finishing point. The location of pickup head eventually will converge to a second search starting point, which is supposed to be the NWA. There is no doubt that the second search starting point should lie between the first search starting point and search finishing point, given the nature that the second search starting point is the result of convergence of the first search starting point and search finishing point. In other words, the second search starting point should be later than the first search starting point but earlier than the search finishing point from the timeline aspect of the optical medium. However, because the first search starting point and search finishing point are consequences of firmware setting, it is possible at times that the timeline relationship between above three locations may not comply with the ideal timeline relationship for them. Therefore, the whole NWA searching firmware should include some precautionary measure, such as steps shown in FIG. 1B; so as to have the entire NWA searching process go on smoothly.

A conventional optical medium includes a plurality of sessions, each including a lead-in area, a program area, and a lead-out area, all of which are distributed thereon in this order. Digital information is recorded in the program area, which each includes at least one program sub-area (track). The first search starting point sometimes is the start time of one given track, but, as the given track is a blank track, the first search starting point should be a little bit earlier than the track start time. For ordinary skilled people in this art, it is very common to have a second predetermined block time duration (preferably the time duration covering 75 blocks) deducted from the track start time. However, it is noted that the value of second predetermined block time duration is the "end product" based on experiences of practitioners in this art. 75 blocks are equal to one second in Compact Disc (CD). While the blank track is the last track of this program area, the search finishing point is the end time of this track, as illustrated in Step 54; instead, the start time of lead-out area will be assigned to the search finishing point (Step 55).

Step 56 is to determine if the difference between the search finishing point and first search starting point is less than a first predetermined block time duration. The rough tuning serves to narrow the gap between the first start searching point and search finishing point. That is, as the difference is less than the first predetermined block time duration, meaning the following NWA searching will be performed much more smoothly, the whole process proceeds to Step 57 to set the second search starting point to be substantially equal to the first search starting point, and then to Step 59 to end the rough tuning; otherwise, the Step 58 will average the first start searching point and search finishing point, so as to set the averaged value to be the second search starting point (Step 58), and, thereafter, the whole process proceeds to Step 61. Theoretically, the difference between the above two reference points even both are configured by the firmware in advance will be narrowed down to be less than the first predetermined block time duration, which preferably is equal to the time duration covering 100 physical blocks, as long as only one Step 58 is performed.

Step 61 is for determining whether the pickup head is on the blank area or not. If so, the search finishing point will be reset to be the second search starting point (Step 63); otherwise, the second search starting point will be assigned to the new first search starting point (Step 62). Thereafter, the whole process returns to Step 56, and then to Steps 57 and 59, because it is apparent that the difference between the (new) first search starting point and search finishing point is not more than 100 block time duration again if they are only averaged once.

Step 74 in FIG. 1B starts the process of fine-tuning including determining if the pickup head at the present time is on the blank area or not (Step 76). If so, the fine-tuning process goes to Step 77, or Step 78. If Step 77, which determines if the second search start point is larger than the first search starting point, has a positive feedback, the fine-tuning will be terminated (Step 79). Otherwise, the whole process goes to Step 80, in which the second search starting point is moved back a fourth predetermined block time duration preferably covering 10 physical blocks, and then to Step 78, in which the current position of pickup head is read out, so as to assign this position to the latest second search starting point.

In the wake of Step 78, Step 81 further determines if the second search starting point is less than the search finishing point. If positive, the fine-tuning proceeds to Step 76, or to Step 82 instead to determine if the current location of the pickup head is at the end track or not. If the whole process goes to Step 82, there are two possible ways to determine the NWA, one of which is to assign the start time of lead-out area located behind the end track (program area) to be the NWA (Step 84), and the other one (Step 83) is to assign the end time of one given track—not the latest track—to be the NWA. Thereafter, both steps (Step 83 and Step 84) go to Step 89 to end the process of NWA searching.

However, the process of fine-tuning further includes steps of searching run-out blocks including moving the second search starting point 3 blocks back time-wise and starting to search run-out blocks. Still taking the packet writing for example, the specification book provides a link block, four run-in blocks, two run-out blocks, and several (generally being equal to 32) user-data blocks, all of which are measured on a one-block time duration basis. Over the period of searching the run-out blocks, the second search starting point is modified with a three-block adjustment each time, so as to avoid overlooking the run-out blocks. Step 95 tries to locate the run-out blocks through reading the current track from the second search starting point, and Step 97 adjusts the location of pickup head back and forth with a one-block adjustment, thereby assigning the latest second search starting point to the NWA (Step 98).

Apparently, Step 97 is necessary in this prior art method, especially while run-out blocks cannot be located in a very short period of time. Once this undesired condition happens, the pickup head inevitably has to be operated under the modes of short seeking and following, resulting in much more time spent on NWA searching and, therefore, slowing down the response time of optical medium players.

SUMMARY OF THE INVENTION

It is therefore a primary objective of the present invention is to provide a method of searching a NWA, which includes steps of decoding digital information that have been stored on the optical medium directly instead of short seeking and following around the target NWA.

In accordance with the claimed invention, the present invention includes steps of providing an optical pickup head and setting a first search starting point thereof with respect to a first predetermined rule; determining if the NWA is located at the latest program sub-area and setting a search finishing point of the optical pickup head with respect to a second predetermined rule; setting a second search starting point with respect to a third predetermined rule if the distance between the search finishing point and the first search starting point is less than a first predetermined block time duration, wherein the decoding begins from the first search starting point; decoding the stored digital information for a third predetermined block time duration; and detecting whether a run-out block has been decoded during an N block time duration, which is less than the third predetermined block time duration, and determining the NWA with respect to a fourth predetermined rule.

It is an advantage of the present invention that the NWA will be located without having short seeking and following around the target NWA performed, thereby saving some more time spent on steps of short seeking and following. Instead, the present invention decodes the digital information that have been stored in last recording operation directly, so as to figure out where the NWA is over a comparatively shorter period of time.

These and other objectives of the present invention will no doubt become obvious to those of ordinary skill in the art after reading the following detailed description of the preferred embodiment that is illustrated in the various figures and drawings.

DESCRIPTION OF THE PREFERRED EMBODIMENT

Figure 1A:
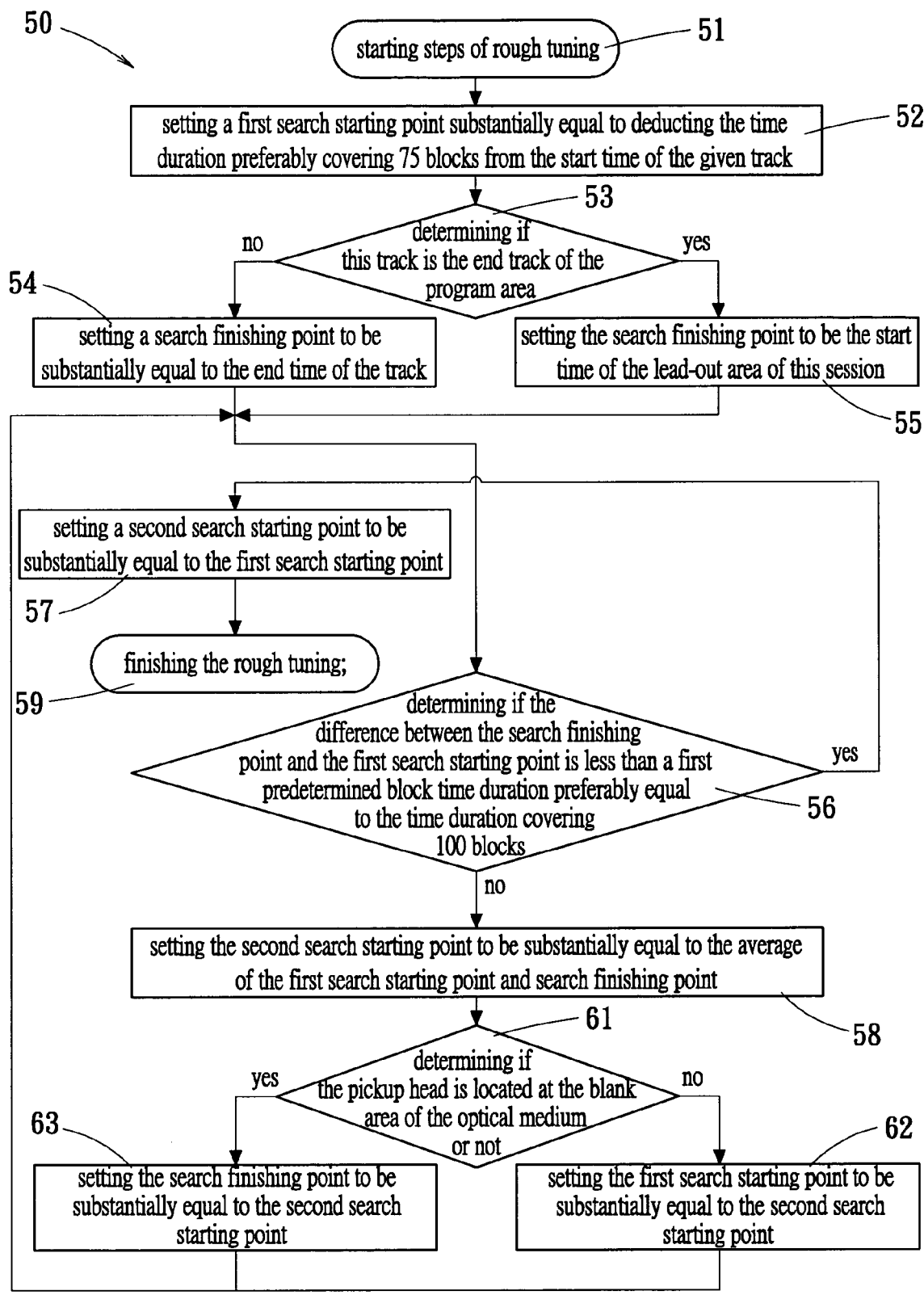
FIGS. 1A to 1C are flow charts illustrating a prior art NWA searching method.
Figure 1B:
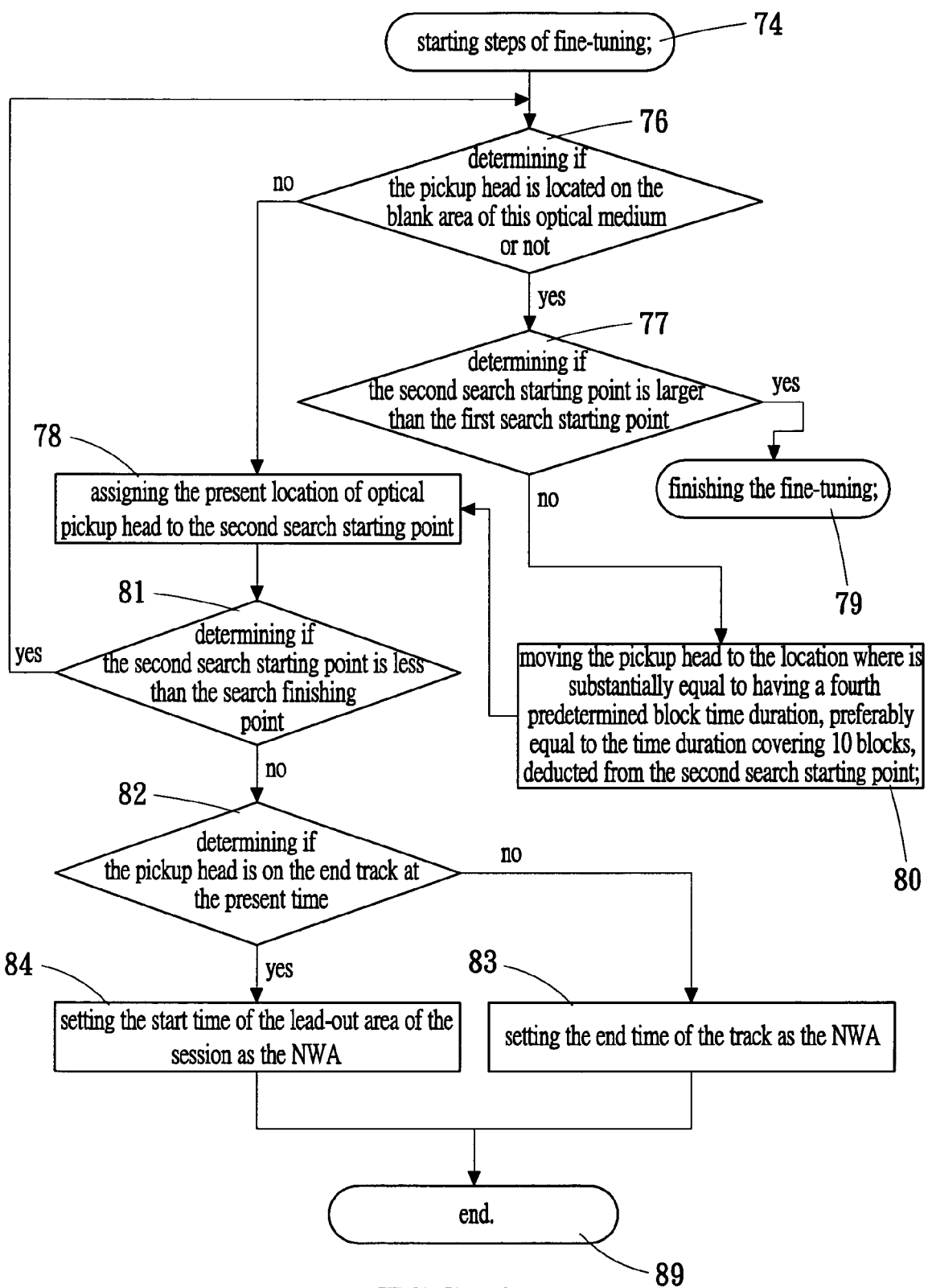
Figure 1C:
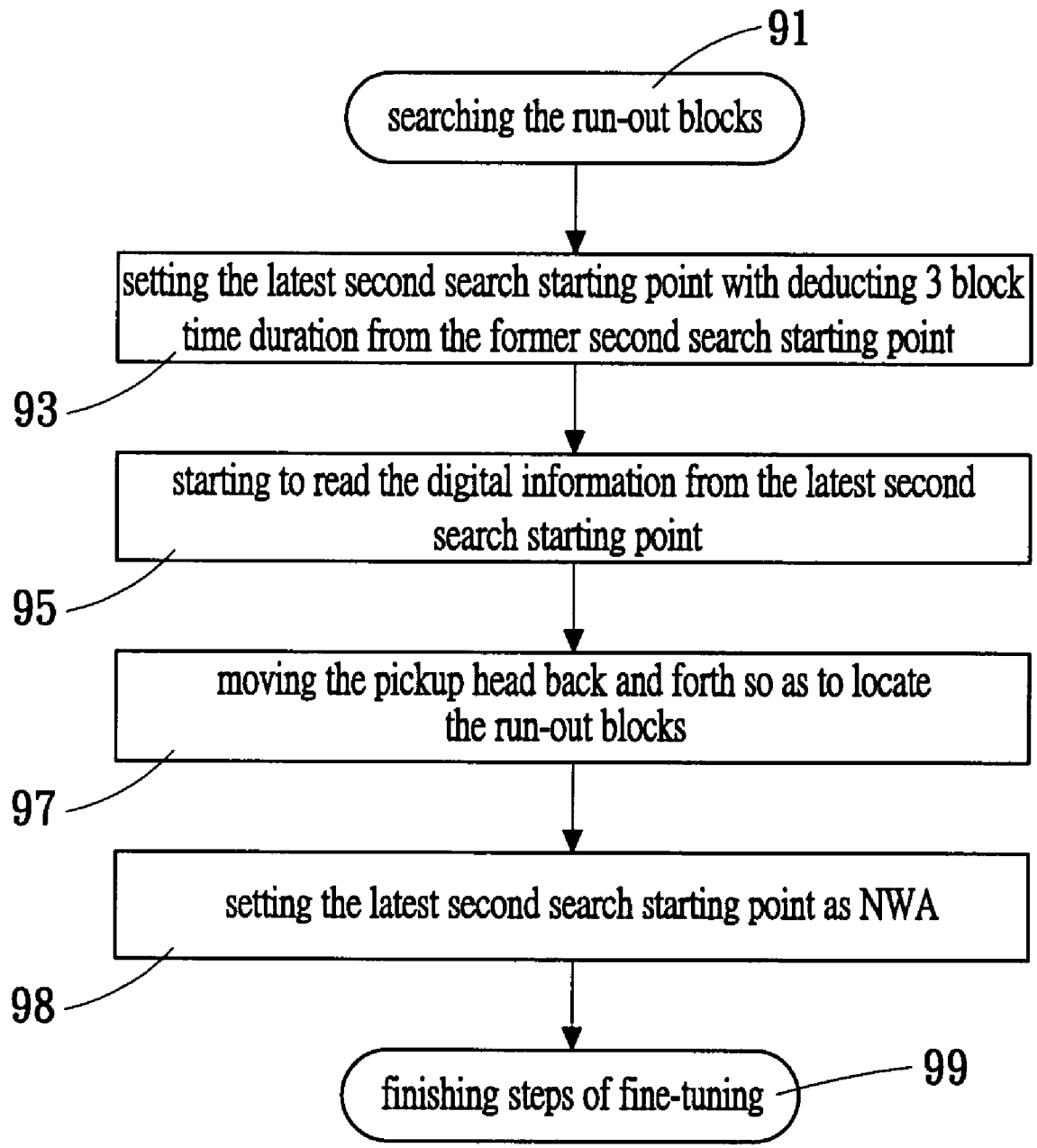
Figure 2:
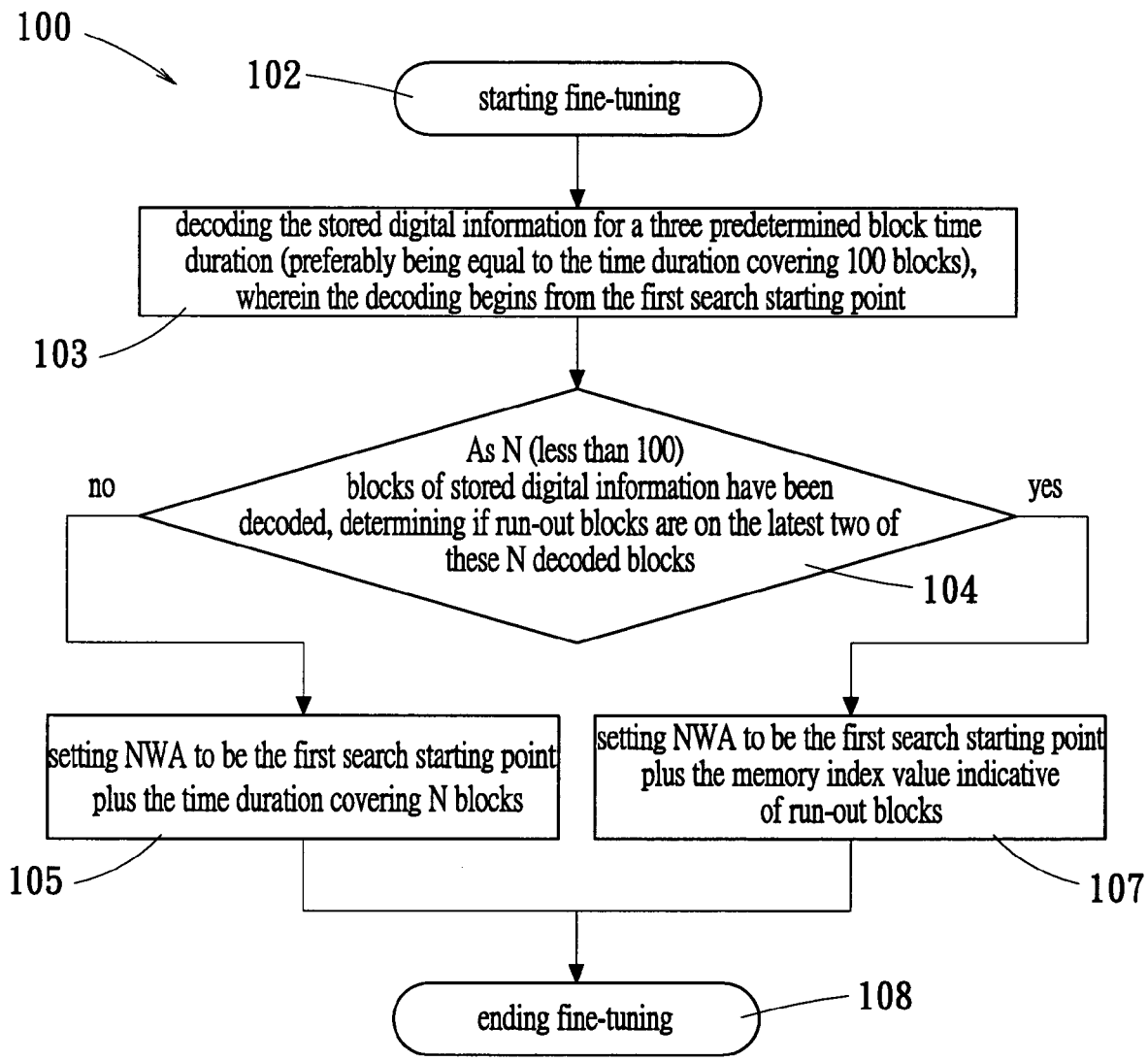
FIG. 2 is a part of the flow chart according to the present invention NWA searching method.

Please refer to FIG. 2 of illustrating a flow chart of a method of searching the NWA 100 according to the present invention. Compared with the prior art description corresponding to FIGS. 1A to 1C, the present invention method only modifies the steps for fine-tuning but leaves the other steps unchanged. In other words, the present invention still includes steps shown in FIG. 1A, which have been illustrated before and are omitted from the following paragraphs. The fine-tuning steps in the present invention method 100 includes:

Step 102: starting fine-tuning;

Step 103: decoding the stored digital information for a three predetermined block time duration (preferably being equal to the time duration covering 100 blocks), wherein the decoding begins from the first search starting point; Step 104: While N (less than 100) blocks of stored digital information have been decoded, determining if run-out blocks are on the latest two of these N decoded blocks, and then moving the whole process to Step 105 or Step 107;

Step 105: setting NWA to be the first search starting point plus the time duration covering N blocks;

Step 107: setting NWA to be the first search starting point plus the memory index value indicative of run-out blocks; and Step 108: ending fine-tuning.

As mentioned earlier, the present invention in fact includes steps in FIG. 1A and FIG. 2. The first search starting point has been set in steps of FIG. 1A, thus steps of FIG. 2 are able to take advantage of the configured first search starting point, such as decoding from the first search starting point that lasts for the third predetermined block time duration covering 100 blocks. While N blocks have been decoded, the present invention starts to find if any of the two run-out blocks exists in the latest two blocks of these decoded N blocks (obviously, N is not larger than 100). Thereafter, the NWA will be determined in Step 105 or Step 107, and then the whole process will be terminated. The fourth predetermined rule is the contents of Step 105 and Step 107.

Admittedly, in comparison with prior arts, the present invention only replaces fine-tuning steps of FIGS. 1B and 1C with another set of fine-tuning steps in FIG. 2 in the wake of having rough tuning steps in FIG. 1A performed. The present invention requires no short-seeking and following in Step 97, but decodes the digital information have been stored into the optical medium in last recording operation, wherein the decoding will last for several predetermined blocks. In other words, following steps in FIG. 1B are replaced with decoding the stored digital information into DRAM of the optical player, and steps in FIG. 1C are replaced with steps of determining if any run-out block has been decoded by acknowledging the data stored in aforementioned DRAM, then the NWA will be determined. Given the fact that no more steps of short-seeking or following will be performed, the searching for NWA mainly relies on decoding stored digital information, and then finds out if any run-out block has been decoded and stored in DRAM, and checks the largest decodable blocks (N). In this case, steps of short seeking and following are not necessary anymore, time spent on NWA searching will be reduced, and the efficiency of optical players having installed the present method therein will increase accordingly.

Those skilled in the art will readily observe that numerous modifications and alterations of the device may be made while retaining the teachings of the invention. Accordingly, the above disclosure should be construed as limited only by metes and bounds of the appended claims.

What is claimed is:

1. A method of searching a new writable address for an optical recordable medium, said optical recordable medium comprising a plurality of sections each having a lead-in area, a program area, and a lead-out area, said program area including at least one program sub-area for storing a digital information, said method comprising the steps of:
   (a) providing an optical pickup head to said program sub-area around the end of a recorded digital information in a former recording operation and setting a first search starting point thereof with respect to a first predetermined rule;
   (b) determining if said new writable address is located at a latest program sub-area and setting a search finishing point of said optical pickup head with respect to a second predetermined rule;
   (c) setting a second search starting point with respect to a third predetermined rule while the distance between said search finishing point and said first search starting point is less than a first predetermined block time duration;
   (d) decoding said stored digital information for a third predetermined block time duration, wherein the decoding begins from said first search starting point; and
   (e) detecting whether a run-out block has been decoded during an N block time duration, wherein said N block time duration is less than said third predetermined block time duration, and determining said new writable address with respect to a fourth predetermined rule.

2. The method of claim 1 wherein said first predetermined rule is for setting said first search starting point being substantially equal to a second predetermined block time duration being deducted from the start time of said program sub-area having not stored said digital information completely.

3. The method of claim 2 wherein said second predetermined block time duration is substantially equal to the time duration covering 75 blocks of said optical recordable medium.

4. The method of claim 1 wherein said second predetermined rule is for setting said search finishing point to be substantially equal to the start time of said lead-out area while said new writable address is located at said latest program sub-area.

5. The method of claim 1 wherein said first predetermined block time duration is substantially equal to the time duration covering 100 physical blocks of said optical recordable medium.

6. The method of claim 1 wherein said third predetermined rule is for averaging said first search starting point while said search finishing point so as to generate said second search starting point as said search finishing point exceeds said first search starting point over said first predetermined block time duration, and, otherwise, for setting said second search starting point to be equal to said first search starting point.

7. The method of claim 6 further comprising a step (f) of determining whether said optical pickup head is on a blank area of said optical recordable medium after averaging said first search starting point and said search finishing point so as to have said second search starting point determined, and assigning said second search starting point to said search finishing point if said optical pickup head is on the blank area, otherwise, assigning said second search starting point to said first search starting point.

8. The method of claim 7 wherein the step of (c) is revisited after the step of (f) is completed, so as to determine if the distance between the latest search finishing point and first search starting point is less than said first predetermined block time duration.

9. The method of claim 1 wherein said third predetermined block time duration is substantially equal to the time duration covering 100 physical blocks of said optical recordable medium.

10. The method of claim 1 wherein the step of (d) is terminated if no said digital information has been decoded from said optical recordable medium.

11. The method of claim 1 wherein said fourth predetermined rule is for adding said N block time duration to said first search starting point if said run-out block has not been decoded in last two decoded blocks of said N blocks, otherwise, adding a memory index value indicative of said run-out block to said first search starting point as said new writable address.

* * * * *